United States Patent [19]

Iversen

[11] Patent Number: 5,203,297
[45] Date of Patent: Apr. 20, 1993

[54] ROTARY ENGINE

[76] Inventor: Dennis D. Iversen, 1600 Cedar St., Sturgis, S. Dak. 57785

[21] Appl. No.: 826,385

[22] Filed: Jan. 27, 1992

[51] Int. Cl.⁵ ............................................. F02B 53/00
[52] U.S. Cl. ...................................... 123/248; 418/17; 418/27
[58] Field of Search ..................... 123/202, 237, 248; 418/17, 23, 24, 27

[56] References Cited

U.S. PATENT DOCUMENTS

| 837,699 | 12/1906 | Marsh | 418/17 |
| 2,392,211 | 1/1946 | Zorich | 418/23 X |
| 3,960,117 | 6/1976 | Kammerer . | |

FOREIGN PATENT DOCUMENTS 522111 3/1921 France ............................ 123/248

377877 8/1932 United Kingdom .

*Primary Examiner*—Michael Koczo
*Attorney, Agent, or Firm*—Richard C. Litman

[57] ABSTRACT

A rotary engine has a plurality of pistons rigidly connected as a single assembly, which pistons advance in a substantially toroidal chamber continuously along an annular path. Included in each of at least one firing position along this path is an inwardly projecting valve defining combustion zones within the chamber, and preventing communication between adjacent combustion zones. Also included in the firing positions are at least one exhaust port, an inlet port and valve, and a spark plug. Power may be taken from a central shaft along the axis of rotation of the piston assembly. The floor of the chamber comprises a movable wall which rises with increasing rotational speed to decrease effective engine displacement.

4 Claims, 4 Drawing Sheets

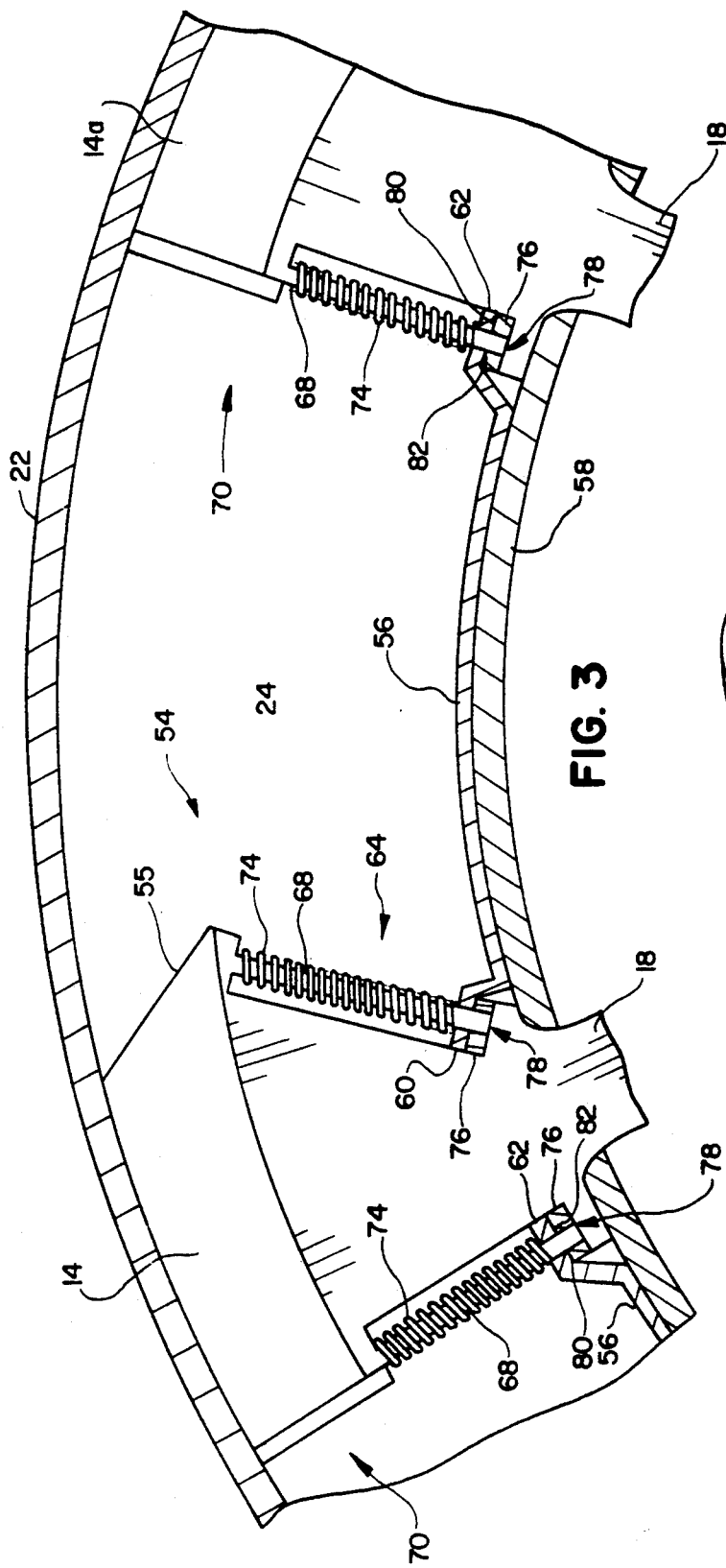
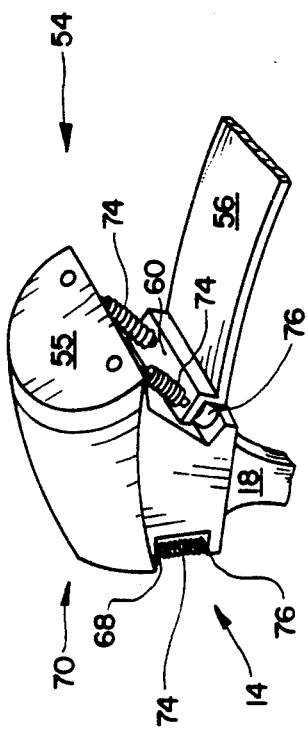
FIG. 3
FIG. 4

ROTARY ENGINE

FIELD OF THE INVENTION

The present invention relates to rotary internal combustion engines, and more particularly to those in which one or more pistons travel in a continuous annular path within a substantially toroidal chamber.

DESCRIPTION OF THE PRIOR ART

U.K. Pat. No. 377,877, issued on Aug. 25, 1932 to Adolf Bachmann, discloses a rotary internal combustion engine having pistons moving in a chamber similarly to the present invention. However, Bachmann provides a combustion prechamber, a flapper valve, flat faced pistons, and constant displacement.

U.S. Pat. No. 3,960,117, issued to Edwin G. Kammerer on Jun. 1, 1976, illustrates a radially inwardly projecting vane forming a chamber dividing valve in a rotary engine.

None of the above inventions and patents, taken either singly or in combination, is seen to describe the instant invention as claimed.

SUMMARY OF THE INVENTION

By the present invention, an improved rotary engine is provided wherein a plurality of pistons in fixed relation to each other moving unidirectionally and constantly along an annular path, this engine having reciprocating valves isolating one combustion zone from the next, as contrasted to Bachmann's flapper valves; having a radially movable lower combustion zone wall, thus providing variable displacement; and having pistons tapered front and rear, thus accommodating the radially movable lower combustion zone wall and further directing incoming fuel and oxidant advantageously.

The combustion zone isolating valves are spring biased to withdraw from the annular chamber to permit passage of each piston in turn. The isolating valves normally remain disposed within the annular chamber, thus preventing communication between the intake phase associated with one piston and the exhaust phase of an adjacent trailing piston. The isolating valves perform the same function as similar valves in the Bachmann patent. However, radial projection into the cylinder in place of Bachmann's hinged flapper valve eliminates periodic collision with the pistons and the attendant stress on valve hinges.

A combustion prechamber provided by Bachmann is also eliminated.

Accordingly, one object of the present invention is to provide a rotary engine of the annular piston path type having variable displacement.

A second object is to provide a rotary engine of the annular piston path type having linearly projecting valves isolating combustion functions between adjacent pistons.

Another object is to provide a rotary engine of the annular piston path type having pistons configured to direct incoming fuel and oxidant advantageously.

These and other objects of the present invention will become readily apparent upon further review of the following specification and drawings.

BRIEF DESCRIPTION OF THE DRAWINGS

FIG. 3 is a partial cross sectional detail view of FIG. 1, drawn to enlarged scale, exaggerated to emphasize the parallel relation between the trailing face of a leading piston and the leading face of a trailing piston.

FIG. 4 is a perspective detail view of a piston, drawn to enlarged scale.

Similar reference characters denote corresponding features consistently throughout the attached drawings.

DETAILED DESCRIPTION OF THE PREFERRED EMBODIMENT

Figure 1:
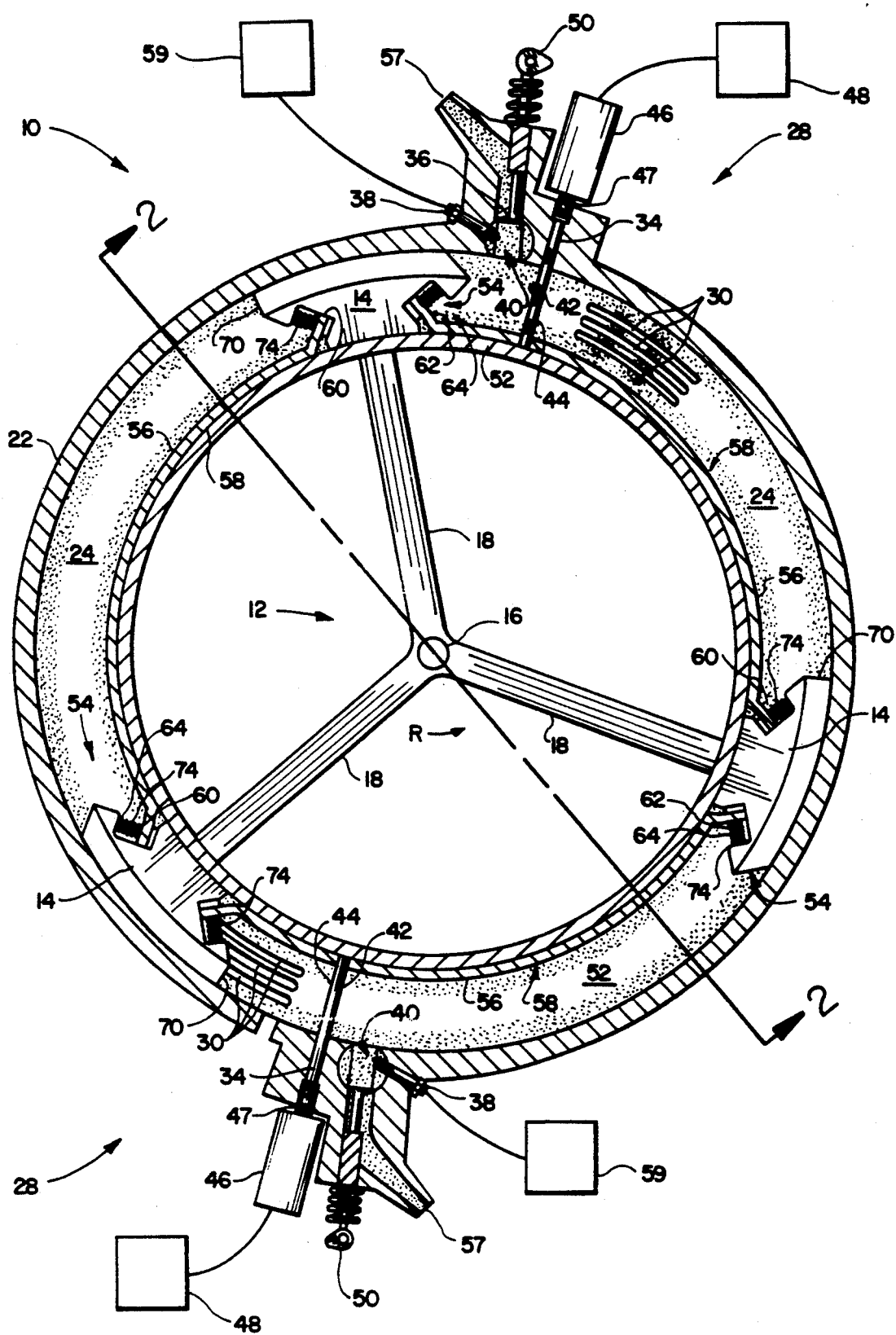
FIG. 1 is a cross sectional view of the invention taken along a plane normal to the axis of rotation of the main shaft.
Figure 2:
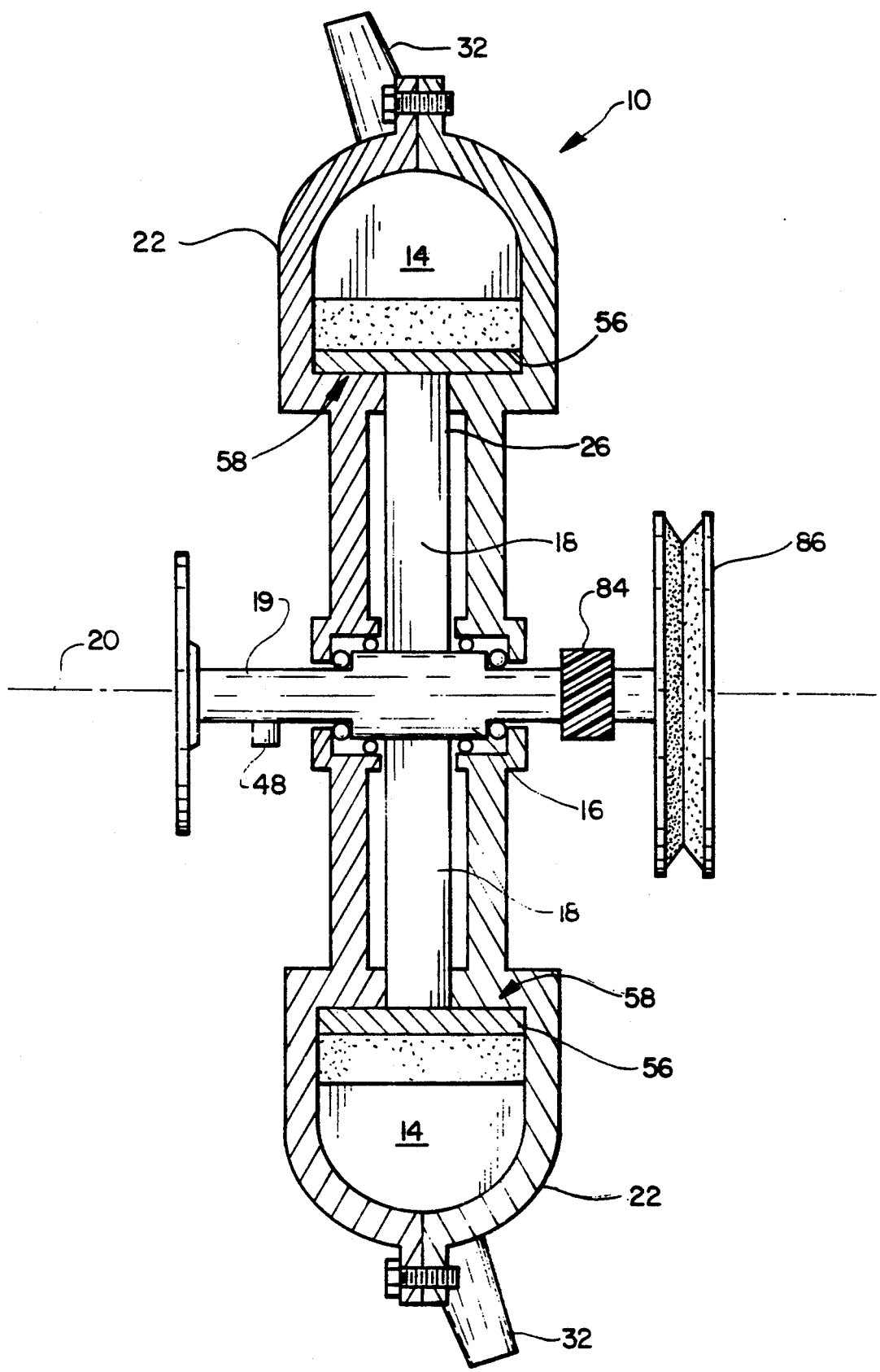
FIG. 2 is a cross sectional view of the invention taken along a plane parallel to the axis of rotation of the main shaft, the invention being sectioned along line A-A of FIG. 1.

As seen in FIG. 1, the engine 10 of the present invention comprises a rigid assembly 12 of pistons 14 connected at a common hub 16 by connecting rods 18. Output of the engine 10 may be harnessed at a central shaft 19, seen in FIG. 2. The pistons 14 advance in an annular path in continuous, unidirectional motion, defining an axis of rotation 20 at the hub 16, direction of rotation R being indicated by arrows. A stationary housing 22 surrounds the assembly 12, this housing 22 defining a tight fitting chamber 24 directly contacting and substantially surrounding the pistons 14. A radial inner gap 26 in the housing 22, better shown in FIG. 2, allows passage of the connecting rods 18 through the housing 22.

At several points along the annular path, two being illustrated but any number being possible, are firing positions 28. Of course, although three are illustrated, the number of pistons 14 may similarly vary. Each firing position 28 includes, in order of contact with each passing piston 14, one or more ports 30, which enable exhaust gas from a previous firing to exit the chamber 24 to an exhaust collection and disposal system 32; reciprocating combustion zone isolating valves 34; inlet valves 36 to recharge the engine 10 with fresh fuel and oxidant, the oxidant preferably being air; and a spark plug 38 disposed within a recess 40, thus avoiding interference with a passing piston 14.

Isolation valves 34 normally project radially inwardly into the chamber 24, preventing communication between a front side 42 and a rear side 44 of the isolating valve 34. The isolating valves 34 are actuated by solenoids 46 and springs 47. Each isolating valve 34 is biased by the spring 47 to assume an open position, retracted from the chamber 24.

Electrical actuating signals are generated by well known apparatus 48, as exemplified by engine ignition systems. The apparatus 48 uses timing signals derived from a central shaft 19, which is timed to operate the inlet valve 36 suitably for the number of pistons 14 used in the engine 10. This is accomplished by conventional means, such as by a shaft or chain (not shown) engaging a gear 84 or a pulley 86 (see FIG. 2) provided for this purpose, and also engaging a corresponding gear or pulley (not shown) disposed upon a camshaft 50. Camshaft 50 operates valves 36 in conventional fashion, and rotatably drives apparatus 48. Apparatus 48, in a manner similar to ignition systems having, illustratively, well known periodically opened and closed contacts (not shown), provides signals for operating solenoid 46.

The driving ratio existing between central shaft 19 and camshaft 50, for example, the ratio of the number of teeth on a crankshaft driving gear 84 to the number of teeth on a corresponding camshaft driven gear (not shown), may be varied to suit the number of valve and ignition operations required according to the number and spacing of pistons 14 and firing positions 28 selected for a particular application.

The timing signal energizes, and upon cessation, de-energizes the solenoid 46, thus periodically moving the isolating valve 34 into the closed position against the spring bias, and allowing the spring 47 to open the isolating valve 34. Use of the spring 47 assures that the isolating valve 34 will be retracted from the chamber 24 in the event of failure of the solenoid 46 or of the timing signals operating the solenoid 46.

General engine operation will now be discussed, with reference being made to FIG. 1. As a piston 14 approaches a firing position 28, the isolating valve 34 opens, retracting from the chamber 24, thus allowing the piston 14 to pass. The isolating valve 34 immediately closes upon the piston 14 passing sufficiently to preclude interference. An intake valve 36 opens, allowing air/fuel mixture which has been previously compressed to enter a newly created combustion zone 52 defined in the chamber 24 between the newly lowered isolating valve 34 and the tapered rear face 54 of the piston 14. The canted rear upper facet 55 directs the incoming air/fuel mixture from a source 57 well into the combustion zone 52. The spark plug 38, connected to a standard ignition system 59, then fires, igniting the fuel and oxidant mixture. The piston 14 is forced to continue its advance by expansion of combustion gases.

A trailing piston 14a approaches the isolating valve 34, which again opens. The trailing piston 14a moves past the isolating valve 34 and advances toward the next isolating valve 34a, which is shut. The exhaust gases are forced toward the exhaust port or ports 30 located just prior to the next closed isolating valve 34a. Exhaust gas is then vented to the collection and disposal system 32.

Each piston 14 thus influences events occurring ahead and behind thereto. In one revolution, a firing position 28 fires three times, or once for every 120 degrees of shaft rotation R, as each piston 14 passes. Similarly, each piston 14 will experience two firings, or one firing for every 180 degrees of shaft rotation R.

Variable displacement is provided by combustion zone movable walls 56 forming the innermost surface 58 of the annular chamber 24. The movable walls 56 span adjacent pistons 14, 14a, best seen in FIG. 3, the movable walls 56 being slidably supported at a front 60 and a rear 62 respectively on the rear lower facet 64 of a piston 14, and on a front face 70 of a trailing adjacent piston 14a.

Figure 5:
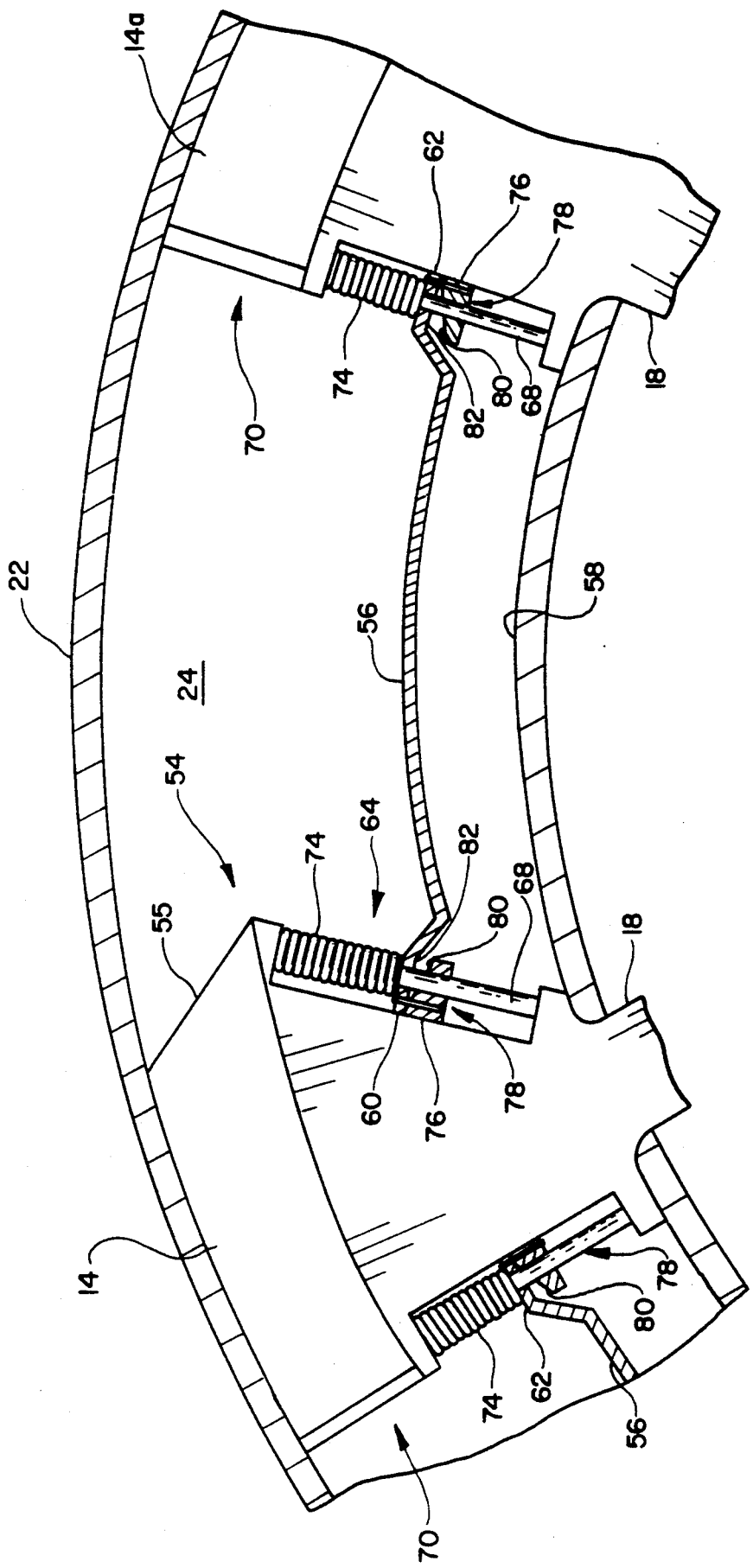
FIG. 5 is an exaggerated partial cross sectional detail view similar to FIG. 3, but showing the chamber movable wall at its greatest displacement from an "at rest" condition.

Two pins 68 located on each rear and front face 54,70 of each piston 14 penetrate cooperating apertures 72 in the movable wall 56. An example of this arrangement is shown on the lower rear facet 64 of a piston 14 in FIG. 4. The movable wall 56 is thus entrapped by four pins 68. Springs 74 fitted around each pin 68 bias the movable walls 56 towards an innermost position, clearly shown in FIG. 3. However, centrifugal force arising from increasing engine rotational speed gradually causes each movable wall 56 to slide radially outwardly along the pins 68. The extent of outward displacement is best seen in FIG. 5. Respective rear face 54 of the piston 14 and front face 70 of piston 14a (see FIG. 3) are parallel so that each movable wall 56 spans a constant dimension even as it moves radially outwardly. FIGS. 3 and 5 are drawn to exaggerate the proximity of two adjacent pistons 14; in the present embodiment employing three pistons 14, the pistons 14 are, preferably, 120 degrees apart.

Disks 76 having bores 78 nonperpendicular to a disk upper surface 80 contact an underside 82 of each movable wall 56. A sudden radially inward impulse, as would occur upon combustion of the fuel, on the movable wall 56, and therefore on the disk 76, causes the disk 76 to bind on the pins 68, obstructing movement. This prevents the pressure created during combustion from forcing the movable wall 56 back to its initial position.

Support functions, such as ignition, cooling, electrical generation, and forced lubrication may be performed conventionally, deriving power from a gear 84 or pulley 86 disposed on the central shaft 19.

It is to be understood that the present invention is not limited to the sole embodiment described above, but encompasses any and all embodiments within the scope of the following claims.

I claim:

1. An internal combustion engine including a plurality of pistons unidirectionally and constantly advancing in a circular path in a chamber, said circular path defining an axis of rotation, each of said pistons having a forward and a rearward face, all of said pistons being rigidly connected to one another at a common hub means by connecting rod means, said engine also having a central shaft being coaxial with said hub means and connected thereto, said central shaft providing means enabling rotatable drive of engine support functions and of a driven load, ignition means rotatably driven from said central shaft, camshaft means rotatably driven from said central shaft, intake valve means operated from said camshaft means, exhaust port means defining openings in said chamber through which exhaust gases pass upon advancement of each of said pistons past said openings following combustion, reciprocating valves periodically projecting into and withdrawing from said chamber, said valves comprising plates configured to cooperate with a cross sectional configuration of said chamber, thereby sealing said chamber and defining segments of said chamber, said segments extending between said reciprocating valves and a trailing face of a passing piston, said segments including said ignition means and serving as combustion chambers, said reciprocating valves normally projecting into said chamber, withdrawing to allow passage thereby of each of said pistons, and returning to their previous positions to projecting positions immediately following said passage, means to actuate said reciprocating valves, means to vary effective piston displacement comprising a radially movable wall of said combustion chamber, said radially movable wall approaching and moving away from an opposing radially spaced wall of said combustion chamber, said radially spaced wall being located outwardly of said movable wall relative to said axis of rotation, said movable wall being slidably connected to a rearward face of one of said pistons, and slidably connected to a forward face of an adjacent trailing piston, whereby said movable wall moves radially outwardly and inwardly, relative to said axis of rotation, to the same extent at both said forward piston face and at said rearward piston face, thus varying effective piston displacement.

2. The invention according to claim 1, each of said pistons having a tapered trailing face comprising two substantially flat facets defining a substantially linear trailing edge and thereby defining an included acute angle, said trailing edge being parallel to said axis of rotation, said two flat facets comprising a lower facet and an upper facet, said lower facet being closer to said axis of rotation than said upper facet, each of said pistons having at least one flat facet defining a leading face, said at least one flat facet defining said leading face of each said piston further being parallel to said lower facet of said trailing face of an adjacent piston leading said piston, said at least one piston leading face flat facet including means slidably supporting one end of one said movable wall, said piston trailing face lower facet also having means supporting one end of one said movable wall, each of said movable walls engaging and spanning a first piston and engaging and spanning a trailing adjacent piston, and having a front and a rear, and further being slidably supported at said front upon said lower facet slidable support means of said first piston, and being slidably supported at said rear upon said slidable support means of said flat facet defining said leading face of said trailing adjacent piston, whereby said movable walls may ascend towards and descend from a radially spaced wall of said combustion chamber, said radially spaced wall being radially more distant from said axis of rotation than said movable wall, thereby reducing and increasing the volume of said combustion chamber.

3. The invention according to claim 2 further comprising linear members attached to each of said lower facets and to each of said flat facets defining said leading face of said trailing adjacent piston, said linear members constraining and guiding said movable walls to move radially inwardly and outwardly, and means opposing sudden, radially inward movement of said movable walls, said means opposing sudden, radially inward movement further allowing gradual radially inward and outward movement of said movable walls.

4. The invention according to claim 3, said means opposing sudden, radially inward movement comprising at least one disk, each said disk surrounding one of said linear members and further having a surface contacting said movable wall, said disk surface being at an angle other than perpendicular to said linear member, whereby a rapid application of pressure causes said disk to bind against said linear member, thus opposing sudden, radially inward movement.

* * * * *